United States Patent [19]

Storp et al.

[11] 4,075,282

[45] Feb. 21, 1978

[54] PROCESS FOR IMPREGNATING ACTIVE CARBON WITH IODINE COMPOUNDS

[75] Inventors: Klaus Storp, Frankfurt am Main; Hans Wirth, Bad Vilbel; Günter Rittinger, Karben; Volker Hohmann, Frankfurt am Main, all of Germany

[73] Assignee: Laboratorium fur Adsorptionstechnik GmbH, Frankfurt am Main, Germany

[21] Appl. No.: 651,350

[22] Filed: Jan. 22, 1976

[30] Foreign Application Priority Data

Feb. 22, 1975  Germany .............................. 2507672

[51] Int. Cl.$^2$ .................... C01B 17/16; C01B 17/00; B01J 27/06; B01J 21/18
[52] U.S. Cl. .................................. 423/230; 423/244; 252/441; 252/444; 252/429 R
[58] Field of Search .................... 252/429 R, 441, 444; 423/230, 244

[56] References Cited

U.S. PATENT DOCUMENTS

| | | | |
|---|---|---|---|
| 2,121,793 | 6/1938 | Goshorn et al. | 423/230 X |
| 3,961,020 | 6/1976 | Seki | 423/244 X |

FOREIGN PATENT DOCUMENTS

| | | | |
|---|---|---|---|
| 1,224,865 | 9/1965 | Germany | 423/230 |
| 1,227,434 | 10/1966 | Germany | 423/230 |
| 1,090,306 | 11/1967 | United Kingdom | 423/244 |
| 1,087,272 | 10/1967 | United Kingdom | 423/230 |

*Primary Examiner*—Patrick P. Garvin
*Assistant Examiner*—William G. Wright
*Attorney, Agent, or Firm*—Karl F. Ross

[57] ABSTRACT

A process for the impregnation of active carbon with an iodine compound in which the solution is also provided with a reducing agent preferably hydrazine or a compound capable of decomposing to produce sulfur dioxide (e.g. a sulfite or hydrogen sulfite) or solubilized sulfur dioxide. The impregnated active carbon can be used for the removal of sulfur dioxide or hydrogen sulfide from a gas stream.

4 Claims, No Drawings

PROCESS FOR IMPREGNATING ACTIVE CARBON WITH IODINE COMPOUNDS

FIELD OF THE INVENTION

The present invention relates to a process for impregnating active carbon with an iodine compound in solution and, more particularly, to the preparation of activated carbon for use as a catalyst or adsorber in the removal of sulfur dioxide or hydrogen sulfide from a gas stream.

BACKGROUND OF THE INVENTION

Apart from the adsorption of gases, vapors and odoriferous materials from gas streams and the purification of liquids, activated carbon has been used to a significant extent in catalytic processes. The catalytic characteristics of activated carbon can be improved by impregnating it with various substances.

Known impregnating agents are, for example, iodine compounds or elemental iodine. The iodine has been found to catalyze, for instance, the transformation of sulfur dioxide from waste gases into sulfuric acid (see German Auslegeschrift 1,227,434) or the oxidation of hydrogen sulfide contained in waste gases to elemental sulfur (see German Auslegeschrift 1,224,865).

The impregnation of the catalyst is generally carried out by spraying the layer of activated carbon with an iodine-containing or an iodine-compound-containing solution or by immersing the active carbon in such a solution or by flooding the active carbon layer with the solution.

A disadvantage of the conventional impregnating processes is found in the difficulty of distributing the iodine compound uniformly in the activated carbon.

Satisfactory distributions of iodine in the adsorber have only been obtained in conventional processes when the spraying or saturation of the active carbon is carried out in an agitated vessel, a rotary drum or the like. Such techniques are costly and it has long been desirous of obtaining a uniform impregnation of activated carbon with iodine compounds for the purposes described above in situ, i.e., in the adsorber or catalyst reactor in which the active carbon is to be used. In other words it is highly preferable to provide a static bed of active carbon in an adsorber or catalytic reactor and to impregnate this bed in place with the iodine compounds without agitation of the bed or other special means for accomplishing the uniform distribution. In practice, however, uniform distributions throughout the static bed with iodine-containing solutions have not been attainable heretofore.

Dissatisfaction has also been experienced with active carbon beds in adsorbers or catalytic reactors which must be after-impregnated with solutions, i.e., for regeneration of the bed, since it is not practical in such cases to use agitation techniques to obtain a uniform distribution of iodine.

The uniformity of the distribution of iodine can be determined by measuring the iodine or iodide concentration at various locations in the bed. When conventional techniques are employed with a static bed impregnated from the top, such measurements show practically all of the iodine concentrated in upper regions of the bed while the lower regions of the bed are substantially free from iodine.

Original impregnation of the static bed or after-impregnation results in a bed in which the greater proportion of the iodine is found in a limited region or layer at the inlet side for the impregnating solution while the greater part of the active carbon is free from iodine although it has been permeated with the solution.

This effect is especially noticeable when the active carbon is saturated with sulfuric acid which arises as the main product or a byproduct in many of the desulfurization processes utilizing active carbon beds. The bed may also be charged with sulfuric acid after washing since the washing operations seldom completely remove the sulfur compounds from the bed.

OBJECT OF THE INVENTION

It is the principal object of the present invention to provide a process for the impregnation of an active carbon bed whereby the aforementioned disadvantages can be avoided and a uniform distribution of iodine in an active carbon bed can be obtained without significant increase in operating costs.

DESCRIPTION OF THE INVENTION

This object is attained, in accordance with the invention, by impregnating a static active carbon bed with a solution which contains, in addition to the iodine or an iodine compound (e.g. a soluble iodide), an additional reducing agent.

Surprisingly, we have found that the presence of an additional reducing agent in the solution results in a greater uniformity of distribution of iodine throughout a static active carbon bed, i.e. a distribution of iodide in the bed which provides the iodide throughout the layer traversed by the impregnating solution.

We have found that practically any reducing agent can be employed as long as it is soluble in the solution and does not react adversely with other components of the solution, the active carbon or the gases or liquids to be treated by the bed. It is important, however, that the reducing agent be capable of reducing oxidizing substances which tend to collect in the gas spaces or interstices of the bed, e.g. atmospheric oxygen, or oxygen or oxidizing substances which tend to adsorb on the active carbon or tend to react therewith in an oxidizing manner.

Especially effective reducing agents are sulfur dioxide and compounds which produce sulfur dioxide by decomposition reactions, e.g. sulfites or hydrogen sulfites, especially alkali-metal sulfites or hydrogen sulfites and particularly sodium sulfite or sodium hydrogen sulfite. Hydrazine has also been found to be an effective reducing agent for the present purposes.

The impregnating solution can be applied to the static bed by spraying or pouring of the solution onto the bed.

Applying the principles of the present invention it is possible to obtain a substantially uniform distribution of iodine or iodide in the bed or to control the distribution of iodine or iodide in the bed to obtain a higher concentration at one side of the bed than at the other.

It has been found to be possible by establishing predetermined iodide and reducing agent concentrations in the impregnating solution and by appropriate choice of the application of the solution to the bed, to obtain predetermined distribution curves for the iodine in the bed. It is possible, therefore, to obtain a maximum impregnation at the beginning, in the middle or at the end of the active carbon layer as desired. For example, with an impregnating solution having a lower concentration of the reducing agent than is necessary to fully reduce all of the oxidizing substances in the active carbon bed, to obtain a stronger impregnation in the upper portions of the active carbon layer if the impregnating solution is sprayed onto the bed, or a stronger concentration of iodine in a lower layer of the bed by flowing the impregnating solution upwardly therethrough.

In general, however, it is preferred to obtain a uniform distribution of the impregnating agent over the entire active carbon layer. In this case it has been found to be advantageous to provide the reducing agent in the impregnating solution in such quantities and concentrations that the reducing agent is present in a stoichiometric excess over the oxidizing substances in the gas space and/or the activated carbon layer.

The absolute quantities of the reducing agent depend upon the characteristics and use of the activated carbon layer. However, it is possible with only a minor amount of experimentation to determine optimum results for any particular purpose and with any active carbon layer in accordance with the degree of impregnation and distribution of iodine desired. It has been found, however, that the minimum amount of the reducing agent should correspond to about three grams of sulfur dioxide or its equivalent per liter of active carbon. By sulfur dioxide equivalent, we mean in this connection a quantity of the reducing agent which is capable of reducing the same amount of oxidizing substances as three grams of sulfur dioxide per liter of the active carbon.

The activated carbon produced in accordance with the present invention has been found to be especially effective for the removal of sulfur dioxide or hydrogen sulfide from gases as described in German Auslegeschriften 1,227,434 and 1,224,865.

SPECIFIC EXAMPLE

An active carbon bed of a height of 50 cm is impregnated by trickling with a potassium iodide solution introduced into the bed from above by spraying. The active carbon is treated to simulate operating characteristics by distributing upon the bed 7.8% by weight sulfuric acid.

The active carbon has an internal surface of 700m$^2$/gr and a bulk specific gravity of 504 gr/liter. It is constituted by crushed coal with a granulometry between 0.5 and 3.0 mm. The bed is provided in each of three tubes having a diameter of 3.2 cm and each one of the tubes, in parallel tests, is treated with 320 ml of impregnating solutions.

Impregnating solution 1 contains 7.35 gr/liter of potassium iodide without reducing agent. Impregnating solution 2 contains 7.35 gr/liter of potassium iodide and 6 gr/liter of sulfur dioxide.

The distribution of iodine in the beds is then determined by analysis and is represented in the following Table.

| ACTIVE CARBON LAYER (measured from above) cm | COMPOSITION OF IMPREGNATING SOLUTIONS | | |
|---|---|---|---|
| | (1) 7.35 g/l KJ Weight % Iodine | (2) 7.35 g/l KJ 6 g/l SO$_2$ Weight % Iodine | (3) 7.35 g/l KJ 23.6 g/l Na$_2$SO$_3$ Weight % Iodine |
| 0 – 10 | 3.4 | 1.14 | 0.97 |
| 10 – 25 | 0.89 | 1.97 | 0.97 |
| 25 – 50 | 0.04 | 0.245 | 0.855 |

From the foregoing Table it will be apparent that, with impregnation without sulfur dioxide addition, the highest iodine concentration is found in the upper 10 cm of the column while the lower half of the column is practically free from iodine. When 6 g/l of sulfur dioxide is used, the iodine penetrates deeper into the active carbon bed. With the addition of 23.6 g/l of sodium sulfite, corresponding to a reducing agent quantity of about 12 g/l sulfur dioxide, one attains a practically uniform distribution of the iodine throughout all layers. In case higher active carbon layers are provided it is merely necessary to adjust the concentration of the impregnating salt (iodine compound) and reducing agent in the solution to obtain a similar uniform distribution.

When a quantity of hydrazine equivalent to 12 g/l sulfur dioxide in reducing characteristics was used, results were similar to those given in the right hand column of the table.

When sodium bisulfite was used in an amount equivalent to 12 g/l sulfur dioxide, the results were again similar to those given in the right hand column of the table. The activated carbon beds attained in the right hand column of the table, both with the use of sodium sulfite, with the use of hydrazine, with the use of 12 g/l of sulfur dioxide and with the use of a corresponding quantity of sodium bisulfite were each used in accordance with the process described in the German Auslegeschriften mentioned earlier to adsorb sulfur dioxide and hydrogen sulfide successfully from waste gases from industrial furnaces.

We claim:
1. A process for the removal of sulfur dioxide or hydrogen sulfide from a gas stream which comprises the steps of:
   a. impregnating in a static state an active-carbon bed with an aqueous solution containing iodine or a water-soluble iodide salt and a reducing agent soluble in said solution and selected from the group which consists of sulfur dioxide, alkali metal sulfites, alkali metal hydrogen sulfites and hydrazine, the quantity of said reducing agent being at least the equivalent of the reducing capabilities of 3 grams of SO$_2$ per liter; and
   b. thereafter passing said gas through the impregnated bed.
2. The process defined in claim 1 wherein said reducing agent is present in said solution in a quantity at least sufficient to stoichiometrically react with oxidizing substances contained within and adsorbed on the carbon of said bed.
3. The process defined in claim 1 wherein said reducing agent is selected from the group which consists of compounds producing sulfur dioxide upon decomposition.
4. The process defined in claim 1 wherein said reducing agent is sodium sulfite or bisulfite.

* * * * *